Jan. 15, 1963    G. J. RITTENHOUSE    3,073,353
ABRASION-RESISTANT VENTILATING JACKET
FOR JET ENGINE STARTER HOSES
Filed June 25, 1958

INVENTOR
GODFREY J. RITTENHOUSE
BY
ATTORNEY

United States Patent Office 3,073,353
Patented Jan. 15, 1963

3,073,353
ABRASION-RESISTANT VENTILATING JACKET
FOR JET ENGINE STARTER HOSES
Godfrey J. Rittenhouse, Croydon, Pa., assignor to H. K. Porter Company Inc., a corporation of Delaware
Filed June 25, 1958, Ser. No. 744,580
1 Claim. (Cl. 138—148)

This invention relates to an abrasion-resistant jacket for jet engine starter hoses and the like which to withstand the extremes of heat and pressure to which they are subjected in service must be constructed from relatively high cost materials readily susceptible to damage from abrasion while being dragged over the ground or paving of an airfield.

One abrasion-resistant jacket for such starter hoses is disclosed in a pending application of Henry E. Fritz, Serial No. 671,287, filed July 11, 1957, now abandoned, entitled Abrasion-Resistant Hose Jacket and Method of Making It, which is assigned to the assignee of this application. That jacket comprises a woven fabric tube contained in and bonded to a wire-reinforced helical rubber strip of substantial thickness, the turns of the helix being spaced at a slightly greater distance from each other than the radial thickness of the strip which forms them whereby the strip alone contacts the ground or paving as the hose is dragged over it and the inner fabric tube, as well as the hose contained within it, is thereby protected from abrasion. But while the said jacket adequately prevents premature failure of the starter hose from causes arising from abrasion alone it not only fails to protect the hose from, but even in some instances may contribute to, damage due to the hot air passing it when it is being used to service jet engines.

As is well known these engines are commonly started by introducing into them large volumes of very hot air moving at high velocity from a suitable blower, turbine or other source and while a single starting operation may be of only brief duration when a number of engines are started in quick succession the hose may attain a temperature close to that of the air passing through it. As the temperature of such air normally is in the neighborhood of 450°–500° F. it is evident that unless heat be dissipated rapidly from the outer surface of the hose the latter may deteriorate prematurely as the outer fabric layer of the hose, usually made of a synthetic polyester fiber such as "Dacron," undergoes quick diminution in tensile strength as its temperature approaches the indicated range.

Hence it is of primary importance that an abrasion-resistant protector for such hose offer as little obstruction as possible to dissipation of heat from the outer surface of the hose and particularly that it afford access of ambient air to the said surface substantially uniformly circumferentially of the hose whereby creation of "hot spots" due, for example, to the heat insulating characteristics of the ground or other support upon which the hose may be resting is minimized.

It is therefore a principal object of the invention to provide a flexible abrasion-resistant outer sleeve or jacket adapted to be telescoped over a flexible hose of the type used for starting jet engines by conveying highly heated air thereto which not only affords to the hose adequate protection against damage from abrasion but also enhances dissipation of heat from its outer surface and permits circulation of ambient air substantially uniformly around the hose.

Other objects, purposes and advantages of the invention will hereinafter more fully appear or will be understood from the following more specific description of an embodiment thereof illustrated in the accompanying drawing in which.

Figure 1:
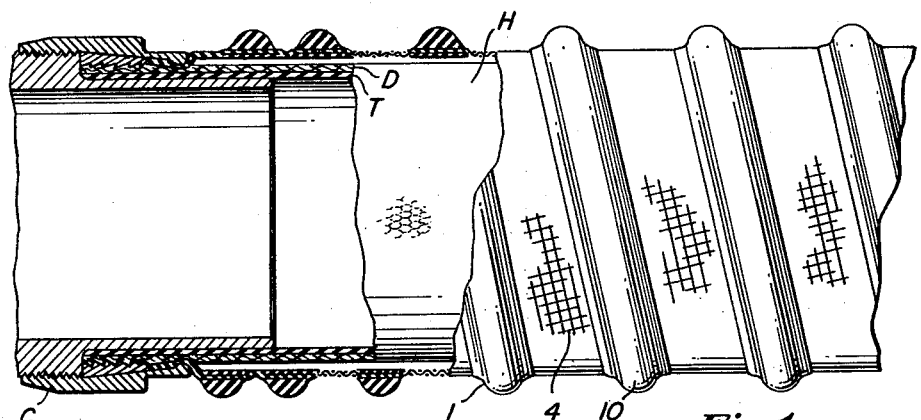
FIG. 1 is a fragmentary side elevation partly in diametral section of an abrasion-resistant hose jacket built in accordance with the invention and associated with a section of jet engine starting hose of a usual type.
Figure 4:
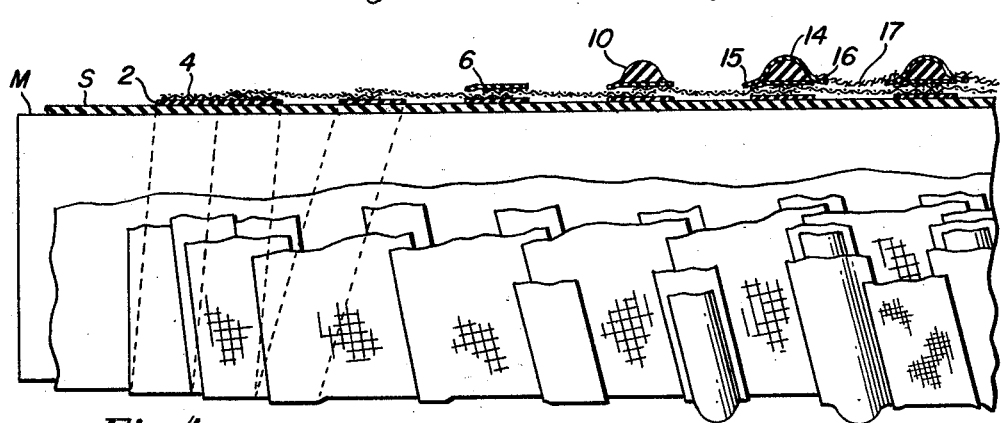
Figure 5:
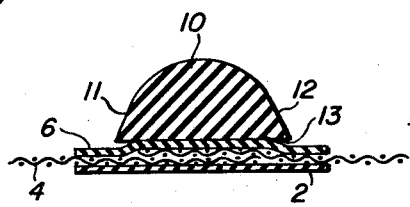
Figure 6:
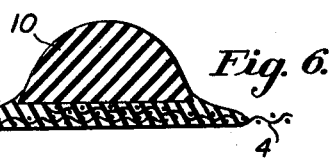

FIG. 4, on the same scale as FIG. 1, is a fragmentary composite side elevation partly in diametral section of the jacket during construction illustrating the several stages resulting from successive steps in its production prior to insertion of a hose therein;

FIG. 5 is an enlarged somewhat diagrammatic fragmentary radial section of the partially completed jacket showing the preferred cross sectional shape of the abrasion-resistant strip embodied in it, and FIG. 6 is a corresponding view of the same jacket after completion, relative thicknesses being exaggerated in FIGS. 1 and 4–6 inclusive.

Referring now more particularly to the drawing, it will be apparent from FIG. 1 that the jacket generally designated 1 therein is adapted to fully enclose a section of hose H having an end coupling C secured to the hose and jacket ends, a similar coupling (not shown) being secured to the other ends; these couplings may be any desired type suitable for releasably connecting the hose, for example, to a source of heated air and to a jet engine.

The structure of jacket 1 may perhaps most readily be made apparent through a description of the steps taken in constructing it, with particular reference to FIG. 4, upon a hollow cylindrical mandrel M having end connections (not shown) for selectively introducing into its interior steam under pressure for heating and water for cooling, as well as fluid discharge means, a mandrel such as disclosed in my copending application Serial No. 715,329, filed February 14, 1958 being eminently useful for the purpose. The mandrel is preferably slightly larger in diameter than the hose to be received in the jacket built with its aid, for example a jacket for jet starter hose H nominally 3½" inside diameter diameter comprising an inner silicone rubber tube T of approximately .094" wall thickness bonded to a braid fabric outer covering D preferably of Dacron or similar spun polyester fiber yarn may be constructed on a mandrel of 4" outside diameter and any suitable length, jackets up to 41'6" long having been made in the manner herein described on a mandrel of somewhat greater length.

In building the jacket an extruded steam-cured butyl rubber sleeve S at least as long as the jacket to be made and dimensioned to hug the mandrel fairly tightly is first telescoped over the mandrel, compressed air being introduced into it from one end to expand it radially during insertion of the mandrel; a thin coating of lubricant in the sleeve or on the mandrel or both further facilitates this operation. Next the outer surface of the sleeve is wiped clean, then supplied with a coating of parting compound and a strip 2 of uncured gum rubber compound is wound about it in a spiral substantially for the full length of the jacket being made, two or three convolutions of this spiral at each of its ends preferably being laid side by side in abutting relation, while intermediate convolutions are applied at a uniform spacing of approximately 1¼" from edge to edge. This spacing provides a spiral winding which when 1" gum rubber strip is employed measures axially about 2¼" from center line to center line of adjacent convolutions except, of course, those at the ends.

Figure 2:
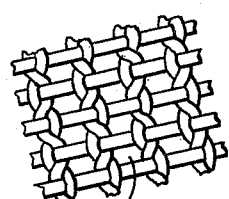
FIGS. 2 and 3 are greatly enlarged details showing respectively the weave of fabrics typical of those which may be used in building the jacket.
Figure 3:
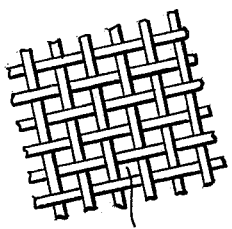

The next step is to wrap about the mandrel, sleeve and spiral gum rubber strip a 2¾" strip or tape 4 of open mesh fabric, preferably a selvage edged Dacron or other suitable polyester fiber reticulated netting of "Leno" weave as illustrated in FIG. 2 or, if preferred, an open or reticulated 1x1 square weave such as illustrated in FIG. 3 may be employed; it is advisable the tape 4 have interstices 5, 5' each with its smallest dimension at least as large as the diameter of the threads or yarns which define it. This tape, preferably after having been first impregnated with a suitable sizing binder and colored if desired to facilitate distinguishing it visually from its background during subsequent winding or "spinning" is applied in a spiral, normally beginning a little closer to an end of the mandrel than the corresponding convolution of gum strip in such manner that its adjacent convolutions overlap about ½" axially in substantial coincidence with the subjacent center line of the gum strip. A second 1" uncured gum rubber strip 6 is next wound over the lapped joint of the tape and about the cut ends of the tape wrapping on the mandrel as well.

A strip 10 of highly abrasion-resistant rubber is now provided, preferably one extruded and steam semi-cured for about eight minutes at 290° F., this strip being approximately semi-circular in cross section (FIG. 5) but with tangent sides 11, 12 forming angles with its flat face or base 13 which may first be mechanically roughened as with a wire brush to improve subsequent adhesion to underlying strip 6. Strip 10 which is of less width across its base 13 than strip 6 and preferably of a minimum thickness close to, or even exceeding, one-half its width, is then wound on the mandrel over strip 6 with the center lines of the two substantially in coincidence, and thus with the end turns of the resultant spiral fairly close together and intermediate ones conforming to a helix of the same pitch as strip 6, which as illustrated is considerably larger than the width of strip 10. The latter strip is then temporarily secured in place by laying over it in a corresponding spiral and under tension a 2½" strip 14 of cured butyl rubber .027"–.030" thick stretched by the tension used so as to cause it to conform to the exposed contour of strip 10 while having its edges 15, 16 snugly bearing against the protruding edges of the overlying gum strip 6. A closely woven nylon fabric tape 17 1½" wide is next wound under tension over the latter edges and the underlying open mesh tape 4 and its ends temporarily secured to the assembly in any convenient way so as to apply radial pressure to the gum during subsequent curing of the uncured components.

Steam at approximately 280° F. (40 p.s.i.) is now admitted to the interior of the mandrel and maintained substantially at that pressure for about one and one-half hours, at the end of which heating is discontinued, the assembly allowed to cool and the nylon tape 17 and butyl rubber strip 14 removed for re-use, leaving the abrasion-resistant strip 10 and underlying gum strips fully cured and intimately bonded in an integral mass (FIG. 6), the interstices in the open mesh fabric of tape 4 insuring intimate bonding of strips 2 and 6 together through the overlapping edges of the tape beneath strip 10.

The assembly including the butyl rubber sleeve S is next removed axially from the mandrel, compressed air introduced into one end of the sleeve facilitating this operation, after which the sleeve is extracted for re-use, leaving the hose jacket ready to receive a hose of corresponding length and adapted for having its ends connected into the same end couplings as are used for the hose itself. However it is not in all cases essential the couplings be positively secured to the jacket ends, particularly if the jacket is somewhat longer than the hose section it is to receive. Thus for a 5' section the jacket is desirably about 5'6" long, whereas for a 40' one it is advisable it be not less than 41'-6" whereby it is somewhat compressed axially between the end couplings when positioned on the hose; this excess length also permits the jacket to elongate with the hose when the latter stretches axially under pressure, the hose then being reinforced circumferentially by the jacket, which constricts about the hose as it elongates.

It will be evident from the foregoing that the jacket provided in accordance with this invention is highly flexible, offering substantially no resistance to bending of the hose contained within it, and effectively holds the hose somewhat above any surface upon which it may rest when in service, thus allowing circulation of air through the open mesh fabric of tape 4 for dissipation of heat throughout the entire circumference of the hose, while preventing abrasive contact between it and any surface over which it may be dragged. The jacket moreover tends to confine the hose within a cylindrical space when undistended, minimizing production of weakening creases and wear points, although the spiral form of the abrasion-resistant strip 10 tends to allow the jacket to collapse angularly in the general direction of its axis when the hose is wound on a reel or hung over a rack, thereby maintaining at a minimum the space it occupies when not in use.

It will be understood it is not asserted I have invented the first abrasion-resistant jacket for flexible hose or the like but it is believed those heretofore known have been incapable of affording adequate protection against damage from abrasion while concurrently maintaining adequate air circulation about the hose to permit dissipation of heat derived from highly heated fluid being conducted through it. Thus my jacket not only holds the hose above a supporting surface to allow air to pass between it and said surface, but in addition by permitting substantial circulation of air through the interstices of the open mesh fabric between adjacent turns of the wear strip 10, promotes heat dissipation thereby and prevents development of localized "hot spots" inevitable when a relatively impervious outer jacket is used to enclose the hose.

It will be noted open mesh tape 4 is applied in my jacket with its warp and filling yarns slightly "on the bias" with respect to the jacket axis, providing for substantially universal flexibility greater than attainable when a fabric jacket has its warp and filling yarns parallel and normal respectively to the jacket axis.

While I usually prefer for the open mesh strip 4 "Leno" weave fabric in which pairs of warp ends are crossed between successive filler yarns as illustrated in FIG. 2, the square woven open mesh 1 x 1 fabric shown in FIG. 3 is considered interchangeable therewith or any other open mesh fabric may be substituted therefor if desired, it being preferred, whatever fabric be employed, that it be impregnated with an elastomeric sizing binder before incorporation into the jacket, whereby subsequent bonding between the fibers of the fabric and the elastomeric strips overlying and underlying the fabric strip overlap is enhanced, the said bonding occurring during the above described vulcanization operation.

While I have herein illustrated and particularly referred to certain specific embodiments of the invention it will be understood I do not desire or intend thereby to limit or confine myself in any way as changes and modifications in the form, composition, structure and relationship of the components of the jacket as well as in the aforesaid mode of constructing it will readily occur to those skilled in the art and may be employed if desired without departing from the spirit and scope of the invention as defined in the appended claim.

Having thus described my invention, I claim and desire to protect by Letters Patent of the United States:

In combination, a relatively fluid-impermeable flexible hose, an abrasion resistant jacket loosely encompassing said hose comprising a spirally extending reticulated fabric having overlapping edges and defining a tube of inside diameter appreciably greater than the outside diameter of the hose, the latter being freely movable in the jacket, adhesive means bonding said edges together and a spirally disposed elastomeric buffer strip of substantial thickness relative to said fabric spanning and exteriorly overlying said overlapping edges, projecting outwardly therefrom and bonded to said adhesive means, the smallest dimension of the openings between the yarns in the fabric at least equalling the thickness of the yarns, the openings providing passages through the jacket for air heated by the hose, and the spacing of the convolutions of the buffer strip approximating twice the thickness of the strip measured radially of the jacket.

References Cited in the file of this patent

UNITED STATES PATENTS

| | | |
|---|---|---|
| 92,381 | Smith | July 6, 1869 |
| 884,634 | Brogg | Apr. 14, 1908 |
| 1,742,775 | Malloy | Jan. 7, 1930 |
| 1,977,775 | Patterson | Oct. 23, 1934 |
| 2,160,240 | Wallace et al. | May 30, 1939 |
| 2,452,047 | Hamblin | Oct. 26, 1948 |
| 2,539,853 | Meyers | Jan. 30, 1951 |